united States Patent Office 3,342,774
Patented Sept. 19, 1967

3,342,774
DIRECT PREPARATION OF AROMATIC POLYIMIDES
Erhard F. Hoegger, Wilmington, Del., assignor to E. I. du Pont de Nemours and Company, Wilmington, Del., a corporation of Delaware
No Drawing. Filed Jan. 20, 1964, Ser. No. 338,624
4 Claims. (Cl. 260—47)

This invention relates to the preparation of polyimides and more particularly to the direct preparation of polyimide structures.

The resulting polyimides are characterized by a recurring unit having the following structural formula:

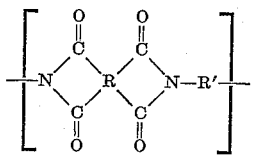

wherein R is an aromatic tetravalent radical; and wherein R' is a divalent organic radical containing at least two carbon atoms.

In U.S. Patent Nos. 3,179,633 and 3,179,634, assigned to the assignee of the present application, are disclosed processes for preparing polyimides which processes are made up of several distinct steps. These steps involve: first, the reaction of certain diamines and dianhydrides under conditions that yield a polyamide-acid composition consisting essentially of recurring units of the formula:

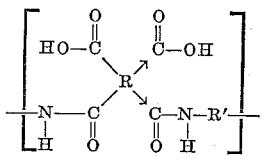

wherein
→ denotes isomerism,
R is aromatic, and
R' is a divalent organic radical;

second, the formation of the polyamide-acid composition into a shaped article; and finally, the heating of the shaped article to convert polyamide-acid in the article to polyimide. Such a process is quite slow and, sometimes, not completely successful and as a result, does not lend itself to some applications.

Among these special applications are the coating of irregularly shaped articles and porous materials such as fabrics and mats which cannot be satisfactorily prepared by proceeding through a converting step.

It is, therefore, an object of this invention to provide a process for the direct preparation of polyimide structures.

It is a further object of this invention to provide a process for the direct preparation of polyimide structures which is more complete in a shorter time. These and other objects will appear hereinafter.

These and other objects of this invention are accomplished by the process comprising essentially completely intermixing in under about one second essentially concurrently with shaping a solution containing an aromatic dianhydride and a dehydrating agent preferably selected from the group consisting of organic carboxylic acid anhydrides, N,N'-dialkyl carbodiimides, lower fatty acid halides, halogenated lower fatty acid halides, halogenated lower fatty acid anhydrides, aryl phosphonic dihalides and thionyl halides and a solution containing an aromatic diamine and a tertiary amine to directly form the polyimide and heating said polyimide to complete imidization.

The starting materials are organic diamines and aromatic tetracarboxylic acid dianhydrides. The organic diamines are characterized by the formula:

$$H_2N—R^1—NH_2$$

wherein $R^1$, the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The preferred $R^1$ groups are aromatic, specifically from the following groups: phenylene, naphthylene, biphenylene, anthrylene, furylene, benzfurylene and

wherein $R^3$ is selected from the group consisting of an alkylene chain having 1–4 carbon atoms,

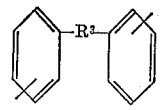

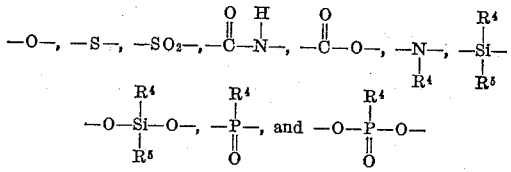

wherein $R^4$ and $R^5$ are alkyl or aryl. Among the diamines which are suitable for use in the present invention are:

metaphenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl) diethyl silane;
bis-(4-amino-phenyl) diphenyl silane;
3,3'-dichloro-benzidine;
bis-(4-amino-phenyl) ethyl phosphine oxide;
bis-(4-amino-phenyl) phenyl phosphine oxide;
bis-(4-amino-phenyl)-N-phenylamine;
bis-(4-amino-phenyl)-N-methyl-amine;
1,5-diamino-naphthalene;
3,3'-dimethyl-4,4'-diamino-biphenyl;
3,4'-dimethyl-3',4-diamino-biphenyl;
3,3'-dimethoxy benzidine;
2,4-bis(beta-amino-t-butyl) toluene;
bis-(para-beta-amino-t-butyl-phenyl) ether;
para-bis-(2-methyl-4-amino-pentyl) benzene;
para-bis-(1,1-dimethyl-5-amino-pentyl) benzene;
m-xylylene diamine;
p-xylylene diamine;
1,3-diamino adamantane;
3,3'-diamino-1,1'-diadamantane;
3,3'-diaminomethyl-1,1'-diadamantane;
bis(para-amino-cyclohexyl) methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-aminopropoxy) ethane;
2,2-dimethyl propylene diamine;

3-methoxyhexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
2,5-diamino-1,3,4-oxadiazole;
2,2-bis(4-aminophenyl) hexafluoro propane;
N-(3-aminophenyl)-4-aminobenzamide;
4-aminophenyl-3-aminobenzoate;

and mixtures thereof.

The aromatic tetracarboxylic acid dianhydrides are characterized by the following formula:

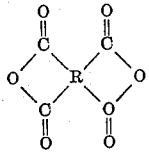

wherein R is a tetravalent aromatic radical, i.e., R is

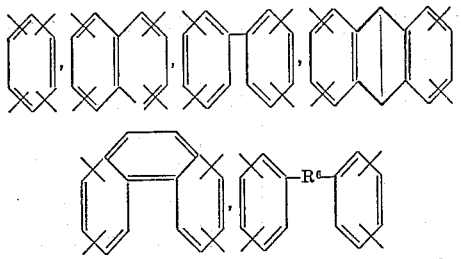

wherein $R^6$ is selected from the group consisting of $R^3$ and

The preferred aromatic dianhydrides are those in which the 4 carbonyl groups of the dianhydride are each attached directly to separate carbon atoms in a ring of the dianhydride and wherein the carbon atoms of each pair of carbonyl groups is directly attached to adjacent carbon atoms in the R group to provide a 5-membered ring as follows:

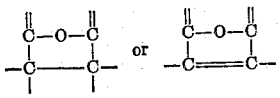

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4,-tetracarboxylic dianhydride;
3,4,3',4'-benzophenone tetracarboxylic dianhydride; etc.

The solvent useful in the solutions of the present invention are the organic solvents whose functional groups do not react with either of the reactants (the diamines or the dianhydrides) to a greater extent than the reactants do with each other. Besides being inert to the system, the organic solvent must be a solvent for at least one of the reactants, preferably for both of the reactants. Stated in another way, the organic solvent is an organic liquid other than either reactants or homologs of the reactants that is a solvent for at least one reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the present invention. The preferred solvents are the lower molecular weight members of this class, particularly N,N-dimethylformamide and N,N-dimethylacetamide. They may easily be removed from the shaped articles by evaporation, displacement or diffusion. Other typical compounds of this useful class of solvents are: N,N-diethylformamide, N,N-diethylacetamide, N,N-dimethylmethoxyacetamide, N - methylcaprolactam, etc. Other solvents which can be used in the present invention are: dimethylsulfoxide, N-methyl-2-pyrrolidone, tetramethylurea, pyridine, dimethylsulfone, hexamethylphosphoramide, tetramethylensulfone, formamide, N-methylformamide and butyrolactone. The solvents can be used alone, in combination of solvents, or in combination with poor solvents such as benzene, benzonitrile, dioxane, butyrolactone, xylene, toluene and cyclohexane.

The quantity of organic solvent used in the process need only be sufficient to dissolve enough of one reactant, preferably the diamine, to initiate the reaction of the diamine and the dianhydride. Generally, the solvent will contain 1 to 25% solids.

There can be used up to 5% excess of either the diamine or the dianhydride. More than 5% excess of either reactant results in an undesirably low molecular weight polyamide-acid. For some purposes, it is desirable to use 1–3% excess of either reactant, preferably the dianhydride; however, high molecular weight products are obtained when equal molar amounts of the reactants are used.

The dehydrating agent is preferably selected from the group of organic carboxylic acid anhydrides, N,N'-dialkyl carbodiimides, lower fatty acid halides, halogenated lower fatty acid halides, halogenated lower fatty acid anhydrides, aryl phosphonic dihalides and thionyl halides.

Besides the preferred acetic anhydride, other operable lower fatty acid anhydrides include propionic, butyric, valeric, mixed anhydrides of these with one another and with anhydrides of aromatic monocarboxylic acids, e.g., benzoic acid, naphthoic acid, etc., and with anhydrides of carbonic and formic acids, as well as aliphatic ketenes (ketene and dimethyl ketene). The preferred anhydrides are acetic anhydride and ketene. Ketenes are regarded as anhydrides of carboxylic acids (ref. Bernthsen-Sudborough, Textbook of Organic Chemistry, Van Nostrand 1935, page 861 and Hackh's Chemical Dictionary, Blakiston 1953, page 468) derived from drastic dehydration of the acids.

Besides benzoic anhydride, other operable aromatic anhydrides include anhydrides of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g., hemellitic, 3,4-xylic, isoxylic and mesitylenic acids; veratric acid; trimethoxy benzoic acid; alpha- and beta-naphthoic acids; and biphenylcarboxylic (i.e., p-phenyl benzoic) acid; mixed anhydrides of the foregoing with one another and with anhydrides of aliphatic monocarboxylic acids, e.g., acetic acid, propionic acid, etc., and with anhydrides of carbonic and formic acids.

The N,N′-dialkyl carbodiimides are represented by the formula R—N=C=N—R wherein the R's can be different alkyl radicals but are generally the same. Preferably, the R groups are lower alkyl groups, i.e., from 1 to 8 carbon atoms.

The halogen containing dehydrating agents include acetyl chloride, bromide, iodide and fluoride; propionyl chloride, bromide, iodide and fluoride, isobutyryl chloride, bromide; n-butyryl chloride, bromide; valeryl chloride; mono-, di- and tri-chloroacetyl chloride; bromoacetyl bromide; chloroacetic anhydride; phenyl phosphonic dichloride; thionyl chloride, bromide, fluoride and chlorofluoride; and trifluoroacetic anhydride.

Tertiary amines having approximately the same activity as the preferred pyridine and isoquinoline may be used in the process. These include 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. The ratio of tertiary amine to anhydride may vary from about zero to almost infinite ratios with a 1:1 ratio being the most commonly used with tertiary amines having the activity of pyridine. These amines are generally used from 0.3 to equimolar amounts with that of the dehydrating agents. Trimethyl amine and triethylene diamine are much more reactive, and therefore are generally used in still smaller amounts. On the other hand, the following operable amines are less reactive than pyridine: 2-ethyl pyridine, 2-methyl pyridine, triethyl amine, N-ethyl morporline, N-methyl morpholine, diethyl cyclohexyl amine, N-dimethyl cyclohexylamine, 4-benzoyl pyridine, 2,4-lutidine, 2,6-lutidine and 2,4,6-collidine, and are generally used in larger amounts.

Rapid, continuous mixing of the solutions in this process can be accomplished in several types of mixers. These range from simple T's to more sophisticated jet mixers. A simple way of comparing the efficiency of these mixers with that of inefficient ones which are of little or no value in this process involves measuring the completeness of mixing versus time and/or distance in the tube or pipe after the mixer. Such a comparison is often expressed in terms of time required for essentially complete mixing. For the present invention, essentially complete intermixing and application to the article in about one second or less is required.

To accomplish rapid mixing, there is, for example, jet-mixing, whereby relatively thin streams of the two solutions are rapidly impelled against each other, thus mixing them by turbulence. Another is spray-mixing, whereby the two solutions are mixed essentially immediately after they leave a suitable spraying orifice. In any event, the solutions are deposited immediately onto a substrate of such a nature that the polyimide is in the desired shaped article when it forms. The quality of the polyamide depends largely upon stoichiometrically equivalent delivery rates. The better the stoichiometric balance, the higher the molecular weight.

Some of the dehydrating agents specified above produce polyimide containing substantial amounts of isoimide. However, the product is converted to a higher or total normal imide content by the post-heat treating step.

This improved direct method for preparing polyimides lends itself to a variety of applications. Thus, if polyimide films are desired, the mixture of the two solutions can be shot against or puddled or spread or cast onto a shaped target which can be a plate or flat belt (optionally heated). Within thirty seconds there forms a gel film of the polyimide, which can be removed and heat-treated to complete the conversion to make the final film. If coatings are desired, the appropriate substrate is simply spray- coated by the emerging stream of the mixed solutions and the substrate thus coated is post-treated by a suitable heat treatment. The mixed solutions can be sprayed into a nonsolvent to form a suspension of polyimide powder.

The improved process of this invention provides a much faster route to shape the polyimides than has been available heretofore. Conversion of the intermediate polyamide-acid is more complete in a shorter time because the converting agents are intimately mixed throughout the reaction mixture and are thus ready to react with polyamide-acid as fast as it forms. This means, of course, that reaction occurs simultaneously throughout the article, in the center as well as on the surface. It is not dependent upon the rate of migration of converting agents into a film of polyamide-acid as is the case when such a film is formed first and then exposed to a converting bath. Furthermore, it is not necessary to chill or otherwise delay the rate of conversion, as is necessary when the converting agents are mixed into the polyamide-acid solution before it is shaped.

The invention can be best understood by referring to the following examples:

Example 1

Two solutions are simultaneously sprayed from two adjacent spray guns, the first one containing a solution of 65.4 g. (0.3 mole) of pyromellitic dianhydride in 270 ml. of acetic anhydride and 120 ml. of dimethylacetamide, and the second consisting of 60.0 g. (0.3 mole) of 4,4′-diaminodiphenyl ether in 270 ml. pyridine and 120 ml. dimethylacetamide. The first solution is prepared at about 50° C. and kept at room temperature during spraying. The two sprays are directed towards a target of aluminum foil and almost instantly a yellow colored liquid is formed. Within 20–40 seconds it becomes a clear gel film. This gel-film-coated aluminum foil is then heated at 120° and 300° for about 1 hour at each temperature.

Infrared spectra are taken of potassium bromide pellets containing film flakes scraped from the aluminum foil. The spectra prove to be almost ifentical to polyimide film made from prior processes. The imide/isoimide ratio is above 2.3, indicating a high n-imide content. The imide/isoimide or otherwise known as n-imide ratio is the ratio of absorbances at $13.80/9.87\mu$ of potassium bromide pellets. The inherent viscosity of this film in fuming nitric acid at 15° is 0.10.

Example 2

Following the procedure as described in Example 1 but using solutions consisting of 65.4 g. of pyromellitic dianhydride in 400 ml. of acetic anhydride and 60.0 g. of 4,4′-diamino-diphenyl ether in 400 ml. pyridine, respectively, similar results are obtained. The first solution is kept at about 110° C., the second between 50 and 80° C. Care is taken to avoid cooling the spray nozzle during the spraying operation. This is achieved by placing the spray gun assembly inside a metal box kept at that temperature by a heat gun and using pre-heated atomizing air (over 100° C.).

Example 3

The following two solutions are forced, at a rate of about 85 ml./min. each, through two arms of a T-shaped jet mixer. Solution A consists of 21.8 g. (0.1 mole) of pyromellitic dianhydride in 135 ml. acetic anhydride and solution B of 20.0 g. (0.1 mole) of 4,4′-diamino-diphenyl ether in 135 ml. pyridine. The two solutions are forced into the T-jet mixer by a positive displacement feeding system. Special care has to be taken in preventing the solutions, particularly the pyromellitic dianhydride solution, from crystallizing out on cooling. Thus, the whole assembly is insulated and heated with steam or infrared lamp. Again clear gel films are obtained on two targets consisting of a glass plate and aluminum foil. Portions of the film stuck tenaciously to the aluminum foil after benzene extraction and heat conversion at 200 and 300° C. for 30 and 10 minutes, respectively.

What is claimed is:
1. The process comprising: essentially completely intermixing in under about one second concurrently with shaping a (1) solution containing, (a) an aromatic dianhydride having the structural formula:

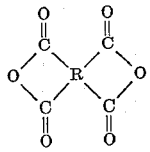

wherein R is an aromatic tetravalent radical and (b) a dehydrating agent and (2) a solution containing (a) an organic diamine having the structural formula:

wherein R' is a divalent organic radical and (b) a tertiary amine to directly form the polyimide/polyamide-acid and heating said polyimide/polyamide-acid to complete imidization.

2. The process of claim 1 wherein the aromatic dianhydride is pyromellitic dianhydride, the dehydrating agent is acetic anhydride, the organic diamine is 4,4'-diamino-diphenyl ether and the tertiary amine is pyridine.

3. The process comprising: essentially completely intermixing in under about one second concurrently with shaping a solution containing an aromatic dianhydride and a dehydrating agent selected from the group consisting of organic carboxylic acid anhydrides, N,N'-dialkyl carbodiimides, lower fatty acid halides, halogenated lower fatty acid halides, halogenated lower fatty acid anhydrides, aryl phosphonic dihalides and thionyl halides and a solution containing an aromatic diamine and a tertiary amine, to directly form the polyimide/polyamide-acid of the desired shape and heating said polyimide/polyamide-acid at a temperature within the range of 300° C. to 600° C. to complete imidization.

4. The process comprising: essentially completely intermixing in under about one second concurrently with shaping a dimethylacetamide solution of pyromellitic dianhydride and acetic anhydride and a dimethylacetamide solution of 4,4'-diamino-diphenyl ether and pyridine to directly form the polyimide/polyamide-acid of the desired shape, the reactants in said solutions being intermixed in stoichiometric proportion and at a temperature within the range of 27 to 150° C. and heating said polyimide/polyamide-acid at a temperature within the range of 300 to 600° C. to complete imidization.

References Cited

UNITED STATES PATENTS 3,179,634   4/1965   Edwards _____ 260—78

WILLIAM H. SHORT, *Primary Examiner.*

H. D. ANDERSON, *Assistant Examiner.*